United States Patent
Kim et al.

(10) Patent No.: US 10,225,811 B2
(45) Date of Patent: Mar. 5, 2019

(54) METHOD FOR OBTAINING SYNCHRONIZATION BETWEEN DEVICES IN WIRELESS ACCESS SYSTEM SUPPORTING DEVICE-TO-DEVICE COMMUNICATION, AND DEVICE SUPPORTING SAME

(71) Applicant: LG ELECTRONICS INC., Seoul (KR)

(72) Inventors: Jinmin Kim, Seoul (KR); Kitae Kim, Seoul (KR); Hyunsoo Ko, Seoul (KR); Jaehoon Chung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 190 days.

(21) Appl. No.: 14/764,111

(22) PCT Filed: Jan. 28, 2014

(86) PCT No.: PCT/KR2014/000785
§ 371 (c)(1),
(2) Date: Jul. 28, 2015

(87) PCT Pub. No.: WO2014/116081
PCT Pub. Date: Jul. 31, 2014

(65) Prior Publication Data
US 2015/0373656 A1 Dec. 24, 2015

Related U.S. Application Data

(60) Provisional application No. 61/757,646, filed on Jan. 28, 2013.

(51) Int. Cl.
*H04W 76/02* (2009.01)
*H04W 74/08* (2009.01)
(Continued)

(52) U.S. Cl.
CPC ...... *H04W 56/002* (2013.01); *H04W 56/0085* (2013.01); *H04W 76/14* (2018.02); *H04W 74/0833* (2013.01); *H04W 92/18* (2013.01)

(58) Field of Classification Search
CPC ...... H04W 56/00; H04W 76/02; H04W 74/08; H04W 74/0833; H04W 8/005;
(Continued)

(56) References Cited

U.S. PATENT DOCUMENTS 8,107,445 B2 * 1/2012 Lee ............... H04W 74/004
370/328
8,913,696 B2 * 12/2014 Mauritz ............ H04J 13/0055
375/142

(Continued)

FOREIGN PATENT DOCUMENTS

WO WO 2011/132818 A1 10/2011

OTHER PUBLICATIONS

3GPP, "3rd Generation Partnership Project; Technical Specification Group Radio Access Network; Study on RAN Improvements for Machine-type Communications; (Release 11)," 3GPP TR 37.868 V11.0.0, Sep. 2011, pp. 1-28.

Primary Examiner — Edan Orgad
Assistant Examiner — Vanneilian Lalchinthang
(74) Attorney, Agent, or Firm — Birch, Stewart, Kolasch & Birch, LLP

(57) ABSTRACT

The present invention, which is used in a wireless access system supporting device-to-device (D2D) communication, defines a new random access channel region and provides methods for obtaining synchronization between D2D devices in the new random access channel region, and devices supporting same. The method for obtaining synchronization between devices in a wireless access system supporting device-to-device (D2D) communication, according
(Continued)

to one embodiment of the present invention, may comprise: a step in which a first terminal receives a D2D preamble from a second terminal via a D2D random access channel (RACH) region in an RACH region; a step in which the first terminal obtains synchronization with the second terminal by using the D2D preamble; and a step in which the first terminal performs D2D communication with the second terminal. The RACH region may comprise a legacy RACH region to which a legacy preamble for performing an RACH procedure with a base station is transmitted, and the D2D RACH region.

8 Claims, 10 Drawing Sheets

(51) Int. Cl.
*H04W 72/04* (2009.01)
*H04W 56/00* (2009.01)
*H04W 76/14* (2018.01)
*H04W 92/18* (2009.01)

(58) Field of Classification Search
CPC .......... H04W 56/002; H04W 56/0085; H04W 76/023; H04W 76/14; H04W 92/18; H04J 13/0059; H04J 13/16

USPC ........................................................ 370/350
See application file for complete search history.

(56) References Cited

U.S. PATENT DOCUMENTS

| | | | |
|---|---|---|---|
| 2007/0171889 A1* | 7/2007 | Kwon | H04L 5/0005 370/350 |
| 2010/0278137 A1* | 11/2010 | Kwon | H04J 13/0059 370/330 |
| 2011/0019694 A1* | 1/2011 | Kwon | H04L 27/2613 370/474 |
| 2011/0235558 A1 | 9/2011 | Diachina et al. | |
| 2012/0033613 A1* | 2/2012 | Lin | H04W 74/085 370/328 |
| 2012/0077507 A1 | 3/2012 | Lee | |
| 2012/0082103 A1 | 4/2012 | Lin et al. | |
| 2013/0029675 A1 | 1/2013 | Kwon et al. | |
| 2013/0157670 A1* | 6/2013 | Koskela | H04W 76/023 455/450 |
| 2013/0308504 A1* | 11/2013 | Nimbalker | H04L 5/001 370/281 |
| 2014/0010172 A1* | 1/2014 | Wei | H04W 76/023 370/329 |

* cited by examiner

FIG. 4
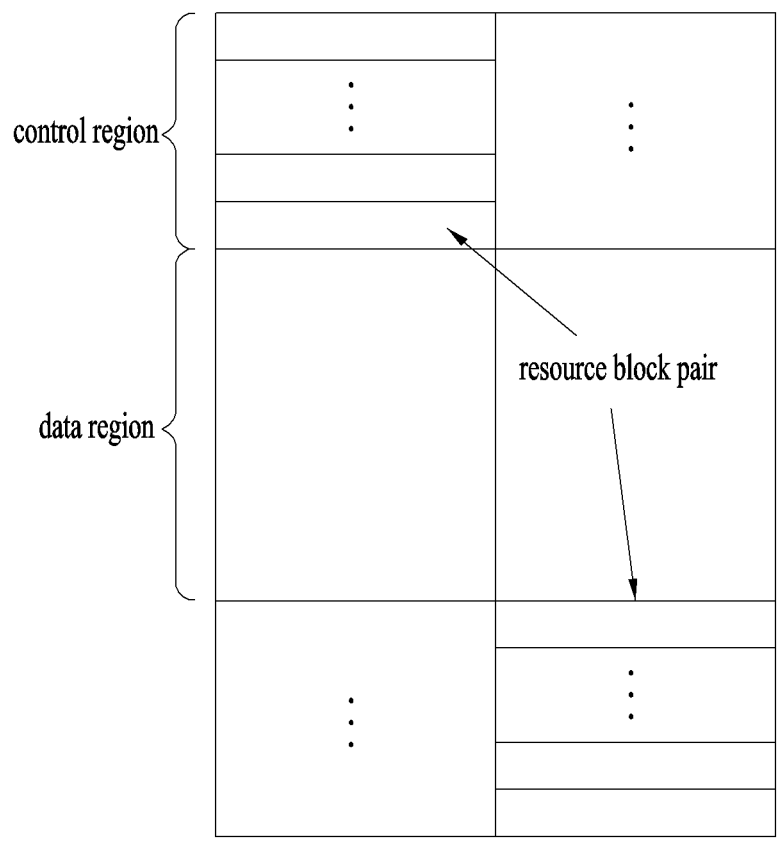
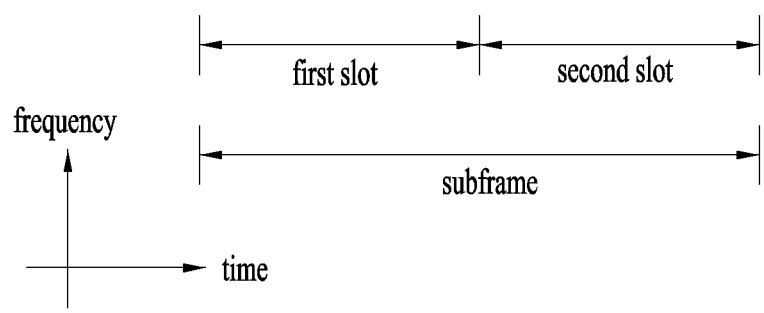

METHOD FOR OBTAINING SYNCHRONIZATION BETWEEN DEVICES IN WIRELESS ACCESS SYSTEM SUPPORTING DEVICE-TO-DEVICE COMMUNICATION, AND DEVICE SUPPORTING SAME

CROSS REFERENCE TO RELATED APPLICATIONS

This application is the National Phase of PCT International Application No. PCT/KR2014/000785, filed on Jan. 28, 2014, which claims priority under 35 U.S.C. 119(e) to U.S. Provisional Application No. 61/757,646, filed on Jan. 28, 2013, all of which are hereby expressly incorporated by reference into the present application.

TECHNICAL FIELD

The present invention, which is used in a wireless access system supporting device-to-device (D2D) communication, relates to methods for defining a new random access channel region and obtaining synchronization between D2D devices in the new random access channel region, and devices supporting the same.

BACKGROUND ART

Hereinafter, a device-to-device (D2D) communication environment used in the present invention will be described in brief.

D2D communication refers to a communication between an electronic device and another electronic device. In a broad sense, D2D communication refers to a wireless or wired communication between electronic devices, or to a communication between a user-controlled device and a machine. However, recently, D2D communication has generally been defined as a wireless communication between an electronic device and another electronic device, which is performed without any human intervention.

In the early 1990's when the D2D communication concept was introduced, D2D was merely understood and recognized as the concept of remotely controlled communication or telematics, and the related market was also limited to such concept. However, over the past few years, D2D communication has been under development at a remarkable rate and has now evolved to a market drawing national and worldwide attention. Most particularly, the D2D communication has greatly influenced diverse fields including Fleet Management, remote monitoring of devices and equipments, smart meter for measuring the operation time of a construction equipment and facilities and for automatically measuring the usage amount of heat or electricity in an applied market related to the Point of Sales (POS) and security. The D2D communication that is to be used in the future is expected to be used and applied for a wider scope of usage in association with the conventional mobile communication and high speed wireless interne or low power communication solutions, such as Wi-Fi and Zigbee, thereby becoming the basis for expanding its market domain to the B2C (Business to Consumer) market, and not being limited only to the B2B (Business to Business) market.

In the age of D2D communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the D2D communication technology may be applied to an enormous range of application.

However, a method for acquiring synchronization between user equipments in the D2D communication has not been known in detail. Particularly, a method for obtaining synchronization between D2D devices without affecting legacy user equipments in an environment that the legacy user equipments and user equipments supporting D2D coexist has not been developed.

DISCLOSURE

Technical Problem

An object of the present invention devised to solve the above problems is to provide a method for obtaining synchronization between user equipments.

Another object of the present invention is to provide a new random access channel region used in D2D communication.

Still another object of the present invention is to provide a method for configuring a random access preamble to obtain synchronization between user equipments and a method for providing random access configuration information.

Further still another object of the present invention is to provide devices for supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention, which is used in a wireless access system supporting device-to-device (D2D) communication, relates to methods for defining a new random access channel region and obtaining synchronization between D2D devices in the new random access channel region, and devices supporting the same.

In one aspect of the present invention, a method for obtaining synchronization between devices in a wireless access system, which supports device-to-device (D2D) communication, comprises a step in which a first user equipment receives a D2D preamble from a second user equipment through a D2D random access channel (RACH) region of an RACH region; a step in which the first user equipment obtains synchronization with the second user equipment by using the D2D preamble; and a step in which the first user equipment performs D2D communication with the second user equipment. In this case, the RACH region may comprise a legacy RACH region to which a legacy preamble for performing an RACH procedure with a base station is transmitted, and the D2D RACH region.

At this time, as one of methods for identifying the legacy RACH region from the D2D RACH region, the legacy RACH region may be allocated to odd subcarriers and the D2D RACH region may be allocated to even subcarriers, and vice versa. Alternatively, the D2D RACH region may be configured with one or more continuous subcarriers, and the legacy RACH region may be configured with one or more subcarriers which are not overlapped with the D2D RACH region.

Also, the legacy RACH region may have a size greater than that of the D2D RACH region.

In the above aspect, the method further comprise a step in which the first user equipment transmits a legacy RACH preamble to the base station through the legacy RACH region to obtain synchronization with the base station.

Also, in the above aspect, the method further comprise a step in which the first user equipment receives a system information block, which includes RACH configuration information, from the base station. At this time, the RACH configuration information may include resource allocation information on the D2D RACH region.

In another aspect of the present invention, a first user equipment for obtaining synchronization between devices in a wireless access system, which supports device-to-device (D2D) communication, comprises a transmitter; a receiver; and a processor for supporting acquisition of synchronization between the devices.

At this time, the processor may be configured to receive a D2D preamble from a second user equipment through a D2D random access channel (RACH) region of an RACH region by using the receiver, obtain synchronization with the second user equipment by using the D2D preamble, and perform D2D communication with the second user equipment by using the transmitter and the receiver. In this case, the RACH region may comprise a legacy RACH region to which a legacy preamble for performing an RACH procedure with a base station is transmitted, and the D2D RACH region.

As one of methods for identifying the legacy RACH region from the D2D RACH region, the legacy RACH region may be allocated to odd subcarriers and the D2D RACH region may be allocated to even subcarriers, and vice versa. Alternatively, the D2D RACH region may be configured with one or more continuous subcarriers, and the legacy RACH region may be configured with one or more subcarriers which are not overlapped with the D2D RACH region.

Also, the legacy RACH region may have a size greater than that of the D2D RACH region.

The processor may further be configured to transmit a legacy RACH preamble to the base station through the legacy RACH region by using the transmitter to obtain synchronization with the base station.

The processor may further be configured to receive a system information block, which includes RACH configuration information, from the base station by using the receiver. In this case, the RACH configuration information may include resource allocation information on the D2D RACH region.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

A new D2D RACH region for obtaining synchronization between D2D devices may be defined in an RACH region, whereby synchronization between the D2D devices may be obtained while affecting the legacy system within a minimum range.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe, which may be used in embodiments of the present invention;

BEST MODE FOR CARRYING OUT THE INVENTION

Figure 1:
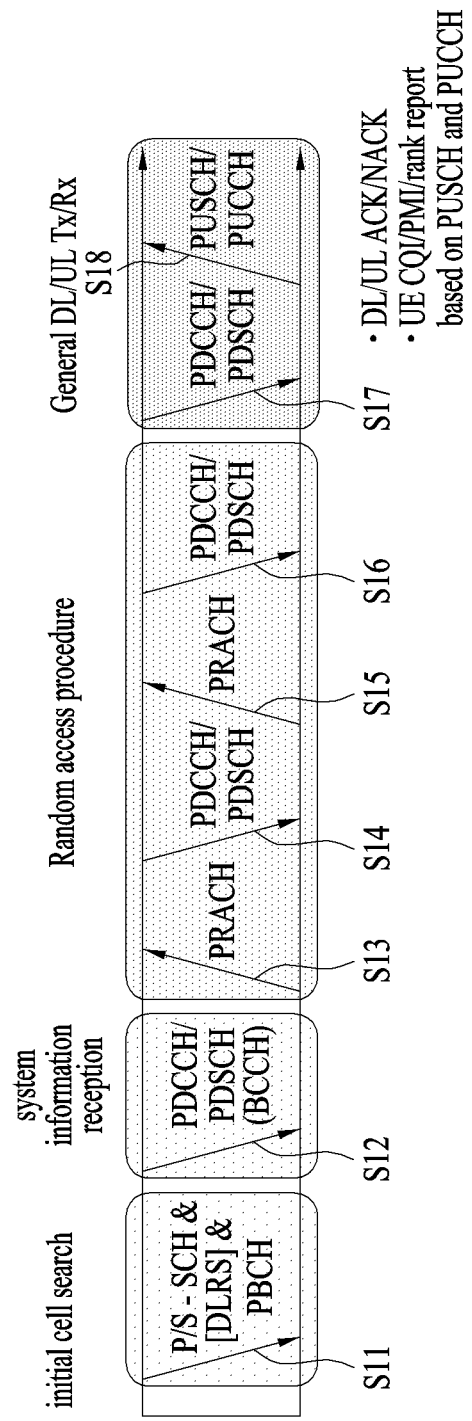
FIG. 1 illustrates physical channels and a general signal transmission method using the physical channels, which may be used in embodiments of the present invention.

Hereinafter, the embodiments of the present invention described in detail, which are used in a wireless access system supporting device-to-device (D2D) communication, provides methods for defining a new random access channel region and obtaining synchronization between D2D devices in the new random access channel region, and devices supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
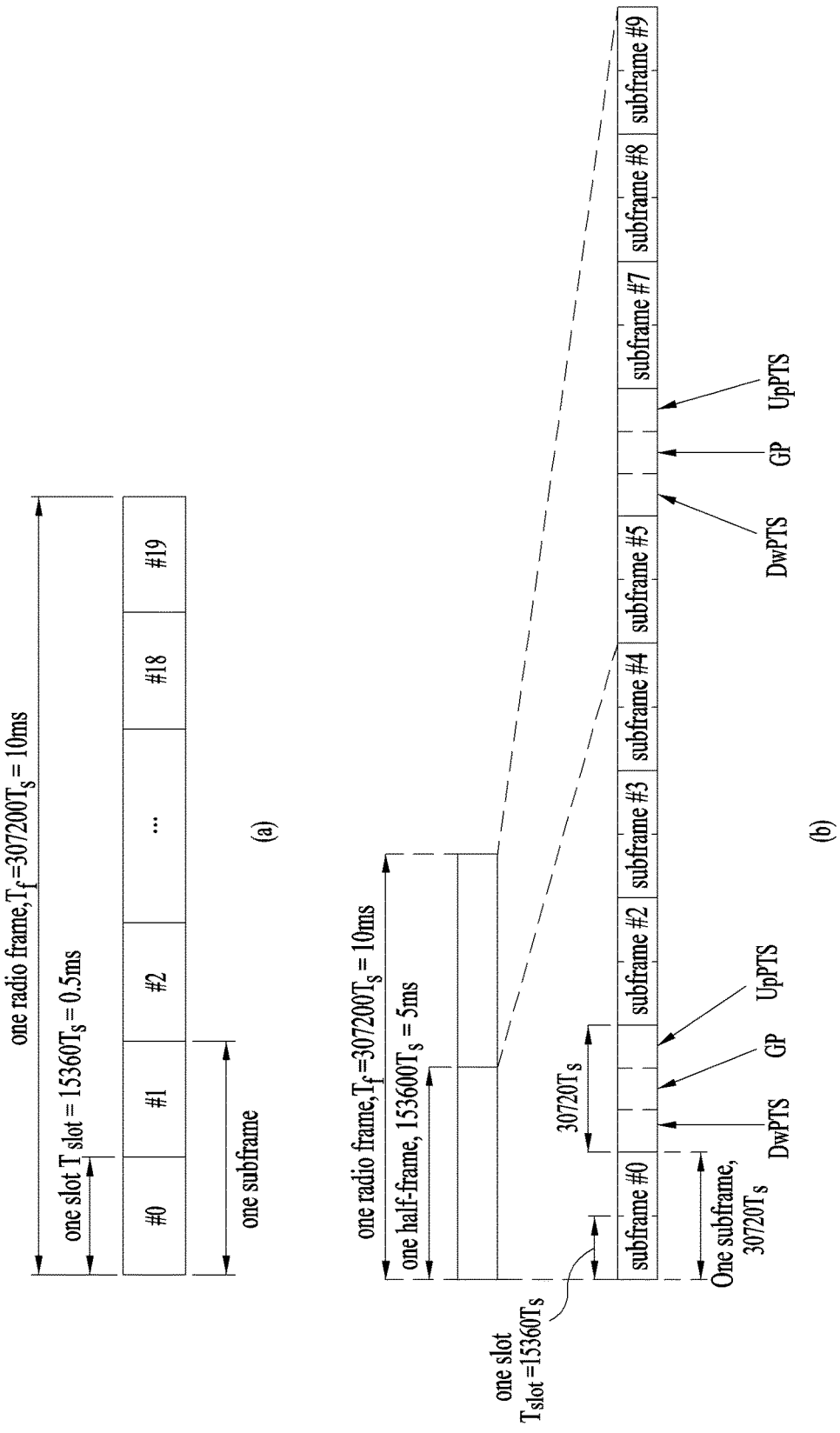
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f = 307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot} = 15360 \cdot T_s$). $T_s$ is a sampling time given as $T_s = 1/(15 \text{ kHz} \times 2048) = 3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cycli prefixc in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s = 1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period.

Figure 3:
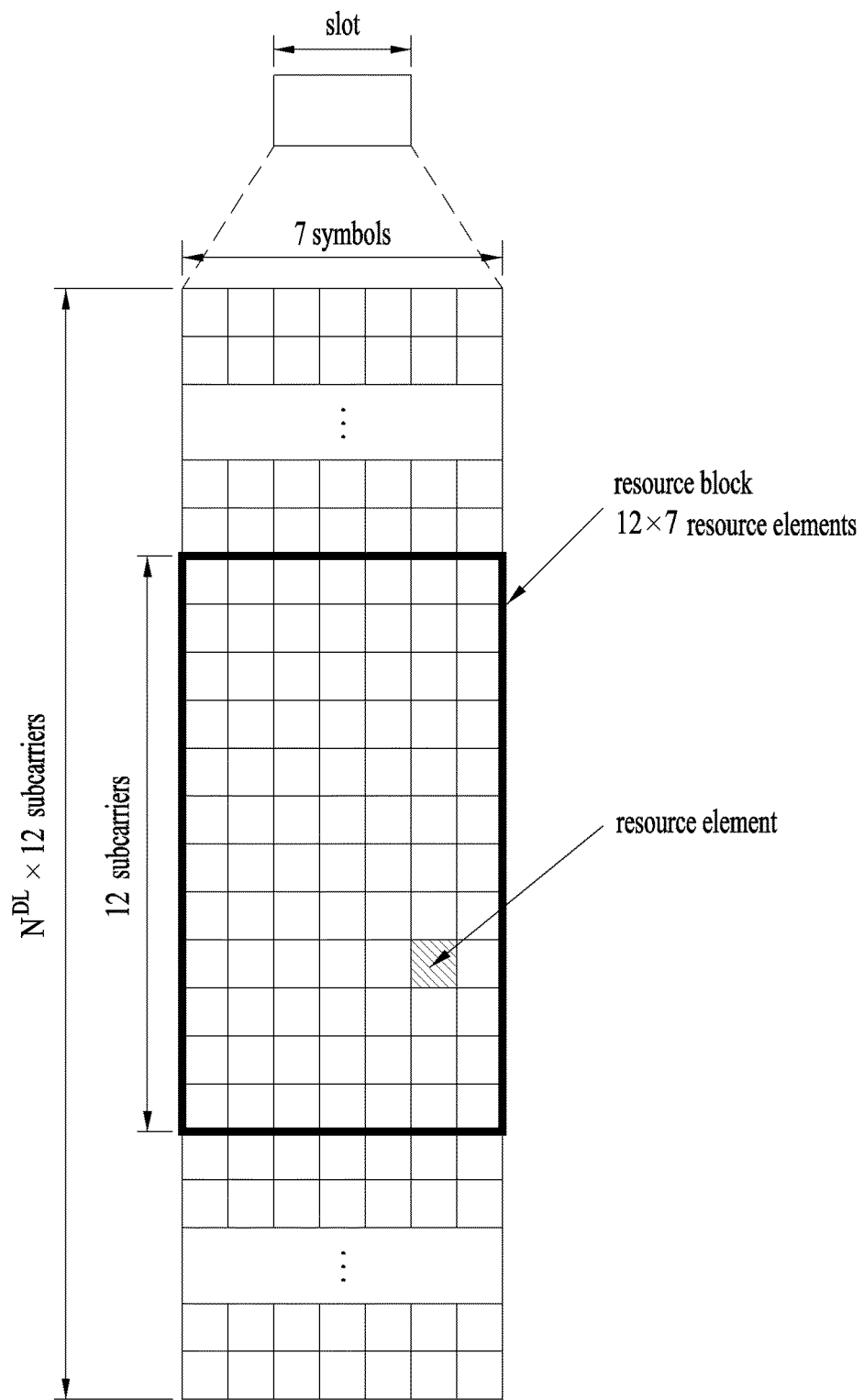
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
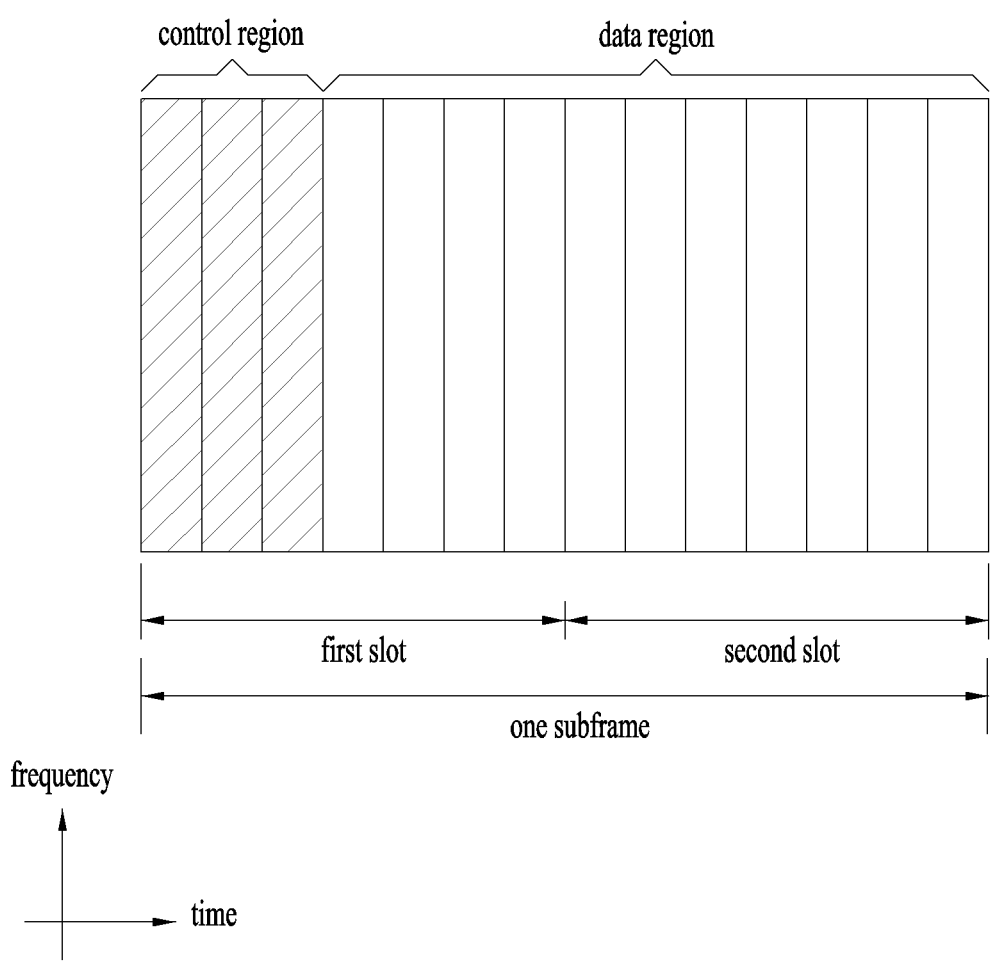
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining) Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
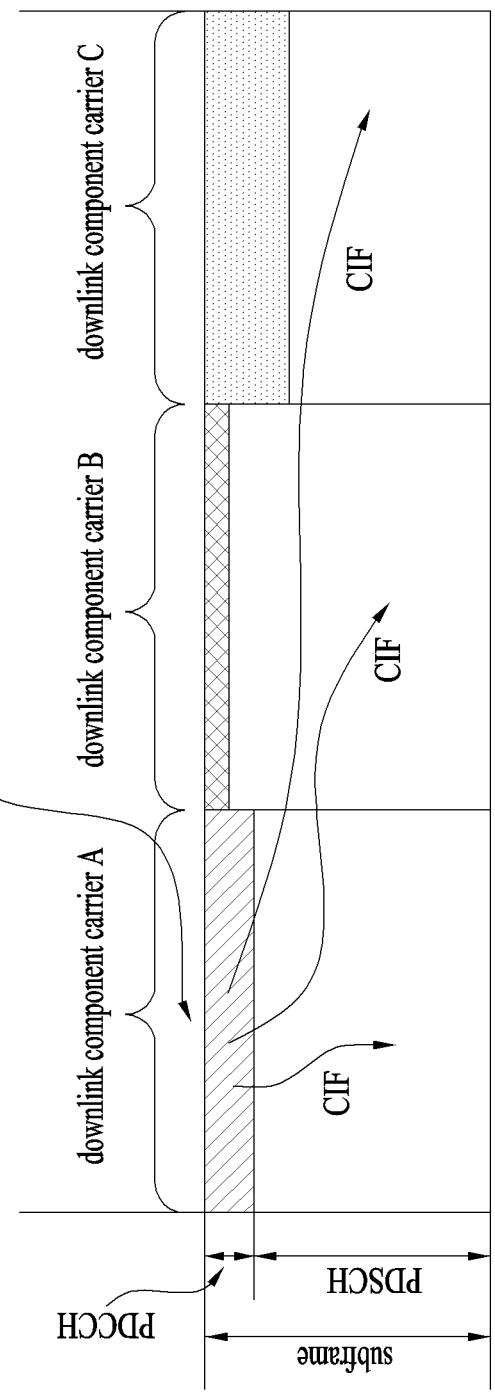
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Random Access Procedure 3.1 Contention-Based Random Access Procedure

Figure 7:
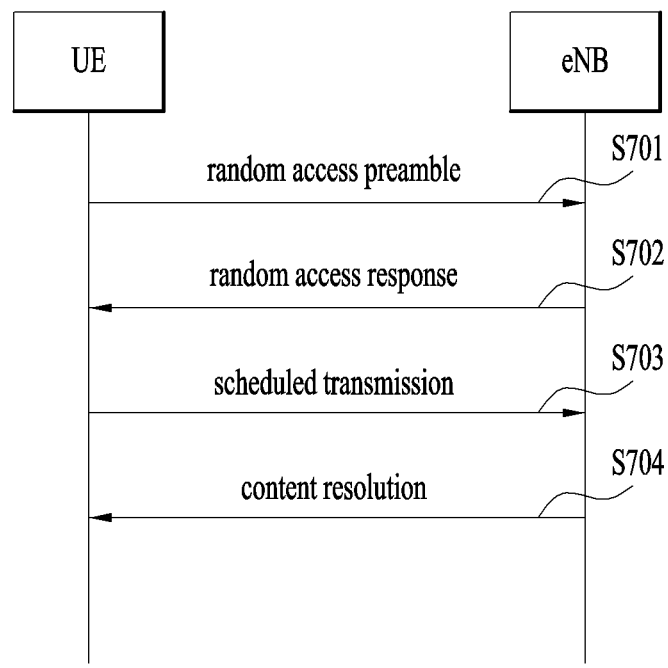
FIG. 7 is a diagram illustrating a signal flow for an operation between a User Equipment (UE) and an evolved Node B (eNB) in a contention-based random access procedure.

FIG. 7 illustrates an operation performed between a UE and an eNB in a contention-based random access procedure.

(1) Transmission of First Message (Msg1)

First, the UE may randomly select a random access preamble from a set of random access preambles indicated by system information or a Handover Command message, select Physical RACH (PRACH) resources, and transmit the selected random access preamble in the PRACH resources to the eNB (S701).

(2) Reception of Second Message (Msg2)

After transmitting the random access preamble in step S701, the UE attempts to receive a random access response within a random access response reception window indicated by the system information or the Handover Command message from the eNB (S702).

Random access response information may be transmitted in a Medium Access Control (MAC) Packet Data Unit (PDU) and the MAC PDU may be transmitted on a PDSCH in step S702. To receive information on the PDSCH successfully, the UE preferably monitors a Physical Downlink Control Channel (PDCCH). The PDCCH may deliver information about a UE to receive the PDSCH, time and frequency information about radio resources of the PDSCH, and information about the transport format of the PDSCH. Once the UE successfully receives the PDCCH directed to it, the UE may appropriately receive a random access response on the PDSCH based on information of the PDCCH. The random access response may include a Random Access Preamble Identifier (RAPID), an UpLink (UL)

Grant indicating UL radio resources, a temporary Cell-Radio Network Temporary Identifier (C-RNTI), and a Timing Advance Command (TAC).

The reason for including an RAPID in the random access response is that one random access response may include random access response information for one or more UEs and thus it is necessary to indicate a UE for which the UL Grant, the temporary C-RNTI, and the TAC are valid. Herein, it is assumed that the UE selects an RAPID matching the random access preamble selected by the UE in step S701.

(3) Transmission of Third Message (Msg 3)

If the UE receives a random access response valid for it, the UE processes information included in the random access response. That is, the UE applies the TAC and stores the temporary C-RNTI. In addition, the UE may store data to be transmitted in response to the reception of the valid random access response in an Msg 3 buffer.

Meanwhile, the UE transmits data (i.e., a third message) to the eNB based on the received UL Grant (S703).

The third message should include an ID of the UE. In the contention-based random access procedure, the eNB may not determine which UE is performing the random access procedure and should identify the UE to resolve collision later.

(4) Reception of Fourth Message (Msg 4)

After transmitting the data including its ID based on the UL Grant included in the random access response, the UE awaits reception of a command from the eNB, for contention resolution. That is, the UE attempts to receive a PDCCH, for reception of a specific message (S704).

From the perspective of the physical layer, a Layer 1 (L1) random access procedure refers to transmission and reception of a random access preamble and a random access response in steps S701 and S702. The other messages are transmitted on a shared data channel by a higher layer, which is not considered to fall into the L1 random access procedure.

An RACH is configured to a size of 6 RBs in one or more contiguous subframes reserved for transmission of a random access preamble. The L1 random access procedure is triggered by a preamble transmission request from a higher layer. A preamble index, a target preamble reception power PREAMBLE_RECEIVED_TARGET_POWER, a matching RA-RNTI, and PRACH resources are part of the preamble transmission request, indicated by the higher layer.

Preamble transmission power $P_{PRACH}$ is calculated by [Equation 1].

$$P_{PRACH} = \min\{P_{CMAX,c}(i), \text{PREAMBLE\_RECEIVED\_TARGET\_POWER} + PL_c\}\_[\text{dBm}] \quad [\text{Equation 1}]$$

In [Equation 1], $P_{CMAX,c}(i)$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power $P_{PRACH}$ using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

3.2 Contention-Free Random Access Procedure

Figure 8:
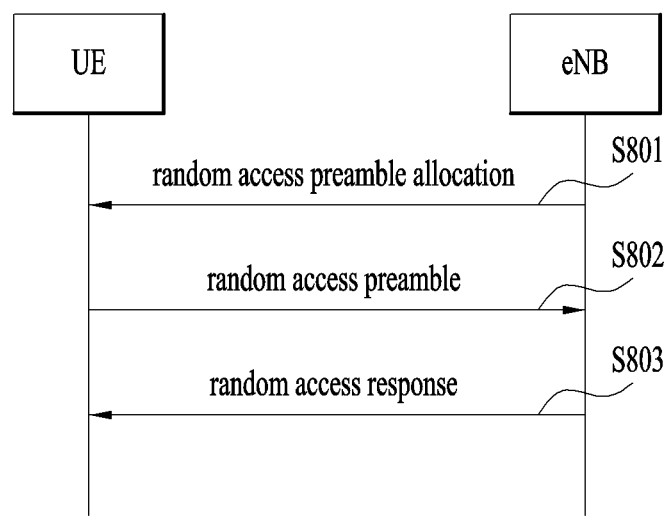
FIG. 8 is a diagram illustrating a signal flow for an operation between a UE and an eNB in a contention-free random access procedure.

FIG. 8 illustrates an operation between a UE and an eNB in a contention-free random access procedure.

Compared to the contention-based random access procedure illustrated in FIG. 8, the contention-free random access procedure ends simply by transmitting the first and second messages. However, before a UE transmits a random access preamble as a first message to an eNB, the eNB allocates the random access preamble to the UE. Then the UE transmits the random access preamble as the first message to the eNB and receives a random access response from the eNB. Thus, the random access procedure ends.

The contention-free random access procedure may be performed in the event of handover or upon request by a command from the eNB. In both cases, the contention-based random access procedure may also be performed.

Referring to FIG. 8, the eNB allocates a dedicated random access preamble that is not likely to collide to the UE, for the contention-free random access procedure. For example, the eNB may indicate the random access preamble to the UE by a Handover Command or a PDCCH order (S801).

The UE transmits the allocated dedicated random access preamble as the first message to the eNB and receives a random access response message in response to the random access preamble from the eNB. Random access response information is received in the same manner as in the contention-based random access procedure illustrated in FIG. 8 (S802 and S803).

3.3 PRACH Preamble

A detailed description will be given of the structure of a PRACH preamble transmitted on an RACH.

Figure 9:
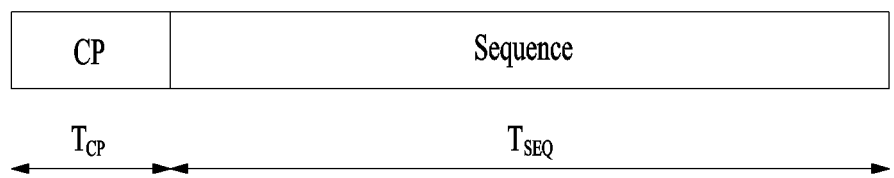
FIG. 9 illustrates an exemplary Physical Random Access Channel (PRACH) preamble that may be used in embodiments of the present invention.

FIG. 9 illustrates an exemplary PRACH preamble that may be used in embodiments of the present invention.

Referring to FIG. 9, the PRACH preamble is divided into a Cyclic Prefix (CP) of length $T_{CP}$ and a sequence of length $T_{SEQ}$. Parameters for the CP and the sequence are determined according to a frame structure and a random access configuration. [Table 2] lists CPs ($T_{CP}$) and sequences ($T_{SEQ}$) for different preamble formats.

TABLE 2

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4* | $448 \cdot T_s$ | $4096 \cdot T_s$ |

Transmission of a random access preamble is confined to specific time and frequency resources in frame structure type 2 and a specific subframe including a UpTPS. These resources are arranged in an ascending order of subframe numbers in a radio frame, starting from a PRB having the lowest index corresponding to index 0 in a frequency area. PRACH resources within radio resources are indicated by PRACH resource indexes in the order illustrated in [Table 3] and [Table 4].

For frame structure type 1, preamble formats 0 to 3 are used. One random access resource per subframe at maximum is provided. [Table 3] lists subframes carrying allowed random access preambles for the preamble formats listed in [Table 2] and given configurations of frame structure type 1. A PRACH configuration index parameter, prach-ConfigurationIndex is indicated by a higher layer. The start of a random access preamble is adjusted to the start of a UL subframe in which a UE estimates $N_{TA}=0$. $N_{TA}$ is a time offset between a UL radio frame and a DL radio frame.

For PRACH configurations 0, 1, 2, 15, 16, 17, 18, 31, 32, 33, 34, 47, 48, 49, 50, and 63, a UE that will perform handover may estimate the absolute value of a relative time offset of radio frame j between a serving cell and a target cell to be less than $153600 \cdot T_s$. The first PRB $n_{PRB}^{RA}$ allocated to a PRACH opportunity considered for preamble formats 0, 1, 2, and 3 is defined as $n_{PRB}^{RA} = n_{PRB\_offset}^{RA}$. Herein, a PRACH frequency offset parameter, prach-FrequencyOffset $n_{PRBoffset}^{RA}$ is expressed as a PRB number configured by a higher layer, satisfying $0 \leq n_{PRBoffset}^{RA} \leq N_{RB}^{UL} - 6$.

[Table 3] illustrates a mapping relationship among PRACH configuration indexes, preamble formats, system frame numbers, and subframe numbers.

TABLE 3

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For preamble formats 0 to 4 of frame structure type 2, a plurality of random access resources may exist in a UL frame according to a UL/DL configuration. [Table 4] below illustrates combinations of a preamble format, a PRACH density value $D_{RA}$, and a version index $r_{RA}$ with respect to PRACH configuration indexes available in frame structure type 2. A PRACH configuration index parameter, Prach-ConfigurationIndex is given by a higher layer. For frame structure type 2 of PRACH configurations 0, 1, 2, 20, 21, 22, 30, 31, 32, 40, 41, 42, 48, 49, and 50 or PRACH configurations 51, 53, 54, 55, 56, and 57 in UL/DL configurations 3, 4, and 5, a UE that will perform handover may estimate the absolute value of a relative time offset of radio frame j between a serving cell and a target cell to be less than $153600 \cdot T_s$.

TABLE 4

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |

TABLE 4-continued

| PRACH configuration Index | Preamble Format | Density Per 10 ms $D_{RA}$ | Version $r_{RA}$ |
|---|---|---|---|
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

[Table 5] below illustrates mapping of physical resources to other random access opportunities needed for a specific PRACH density $D_{RA}$.

TABLE 5

| PRACH configuration Index (see Table 4) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) (0, 0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) |
| 9 | (0, 0, 0, 1) (0, 0, 0, 2) (0, 0, 1, 2) | (0, 0, 0, 0) (0, 0, 0, 1) (0, 0, 1, 1) | (0, 0, 0, 0) (0, 0, 1, 0) (1, 0, 0, 0) | (0, 0, 0, 0) (0, 0, 0, 1) (0, 0, 0, 2) | (0, 0, 0, 0) (0, 0, 0, 1) (1, 0, 0, 1) | (0, 0, 0, 1) (1, 0, 0, 0) (2, 0, 0, 0) | (0, 0, 0, 1) (0, 0, 0, 2) (0, 0, 1, 1) |
| 10 | (0, 0, 0, 0) (0, 0, 1, 0) (0, 0, 1, 1) | (0, 0, 0, 1) (0, 0, 1, 0) (0, 0, 1, 1) | (0, 0, 0, 0) (0, 0, 1, 0) (1, 0, 1, 0) | N/A | (0, 0, 0, 0) (0, 0, 0, 1) (1, 0, 0, 0) | N/A | (0, 0, 0, 0) (0, 0, 0, 2) (0, 0, 1, 0) |
| 11 | N/A | (0, 0, 0, 0) (0, 0, 0, 1) (0, 0, 1, 0) | N/A | N/A | N/A | N/A | (0, 0, 0, 1) (0, 0, 1, 0) (0, 0, 1, 1) |
| 12 | (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) | (0, 0, 0, 0) (0, 0, 1, 0) (1, 0, 0, 0) (1, 0, 1, 0) | (0, 0, 0, 0) (0, 0, 0, 1) (0, 0, 0, 2) (1, 0, 0, 2) | (0, 0, 0, 0) (0, 0, 0, 1) (1, 0, 0, 0) (1, 0, 0, 1) | (0, 0, 0, 0) (1, 0, 0, 0) (2, 0, 0, 0) (3, 0, 0, 0) | (0, 0, 0, 1) (0, 0, 0, 2) (0, 0, 1, 0) (0, 0, 1, 1) |
| 13 | (0, 0, 0, 0) (0, 0, 0, 2) (0, 0, 1, 0) (0, 0, 1, 2) | N/A | N/A | (0, 0, 0, 0) (0, 0, 0, 1) (0, 0, 0, 2) (1, 0, 0, 1) | N/A | N/A | (0, 0, 0, 0) (0, 0, 0, 1) (0, 0, 0, 2) (0, 0, 1, 1) |
| 14 | (0, 0, 0, 0) (0, 0, 0, 1) (0, 0, 1, 0) (0, 0, 1, 1) | N/A | N/A | (0, 0, 0, 0) (0, 0, 0, 1) (0, 0, 0, 2) (1, 0, 0, 0) | N/A | N/A | (0, 0, 0, 0) (0, 0, 0, 2) (0, 0, 1, 0) (0, 0, 1, 1) |
| 15 | (0, 0, 0, 0) (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) (1, 0, 0, 1) | (0, 0, 0, 0) (0, 0, 1, 0) (1, 0, 0, 0) (1, 0, 1, 0) (2, 0, 0, 0) | (0, 0, 0, 0) (0, 0, 0, 1) (0, 0, 0, 2) (1, 0, 0, 1) (1, 0, 0, 2) | (0, 0, 0, 0) (0, 0, 0, 1) (1, 0, 0, 0) (1, 0, 0, 1) (2, 0, 0, 1) | (0, 0, 0, 0) (1, 0, 0, 0) (2, 0, 0, 0) (3, 0, 0, 0) (4, 0, 0, 0) | (0, 0, 0, 0) (0, 0, 0, 1) (0, 0, 0, 2) (0, 0, 1, 0) (0, 0, 1, 1) |
| 16 | (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 0) (0, 0, 1, 1) (1, 0, 1, 1) | (0, 0, 0, 0) (0, 0, 0, 1) (1, 0, 0, 0) (1, 0, 1, 0) (2, 0, 1, 0) | (0, 0, 0, 0) (0, 0, 0, 1) (0, 0, 0, 2) (1, 0, 0, 0) (1, 0, 0, 2) | (0, 0, 0, 0) (0, 0, 0, 1) (1, 0, 0, 0) (1, 0, 0, 1) (2, 0, 0, 0) | (0, 0, 0, 0) (1, 0, 0, 0) | N/A |
| 17 | (0, 0, 0, 0) (0, 0, 0, 1) (0, 0, 0, 2) (0, 0, 1, 0) (0, 0, 1, 2) | (0, 0, 0, 0) (0, 0, 0, 1) (0, 0, 1, 0) (1, 0, 0, 0) | N/A | (0, 0, 0, 0) (0, 0, 0, 1) (0, 0, 0, 2) (1, 0, 0, 0) (1, 0, 0, 1) | N/A | N/A | N/A |
| 18 | (0, 0, 0, 0) (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 1) (0, 0, 1, 1) (1, 0, 0, 1) (1, 0, 1, 1) | (0, 0, 0, 0) (0, 0, 1, 0) (1, 0, 0, 0) (1, 0, 1, 0) (2, 0, 0, 0) (2, 0, 1, 0) | (0, 0, 0, 0) (0, 0, 0, 1) (0, 0, 0, 2) (1, 0, 0, 0) (1, 0, 0, 1) (1, 0, 0, 2) | (0, 0, 0, 0) (0, 0, 0, 1) (1, 0, 0, 0) (1, 0, 0, 1) (2, 0, 0, 0) (2, 0, 0, 1) | (0, 0, 0, 0) (1, 0, 0, 0) (2, 0, 0, 0) (3, 0, 0, 0) (4, 0, 0, 0) (5, 0, 0, 0) | (0, 0, 0, 0) (0, 0, 0, 1) (0, 0, 0, 2) (0, 0, 1, 0) (0, 0, 1, 1) (1, 0, 0, 2) |

TABLE 5-continued

| PRACH configuration Index (see Table 4) | UL/DL configuration (See Table 4.2-2) | | | | | | |
|---|---|---|---|---|---|---|---|
| | 0 | 1 | 2 | 3 | 4 | 5 | 6 |
| 19 | N/A | (0, 0, 0, 0) | N/A | N/A | N/A | N/A | (0, 0, 0, 0) |
| | | (0, 0, 0, 1) | | | | | (0, 0, 0, 1) |
| | | (0, 0, 1, 0) | | | | | (0, 0, 0, 2) |
| | | (0, 0, 1, 1) | | | | | (0, 0, 1, 0) |
| | | (1, 0, 0, 0) | | | | | (0, 0, 1, 1) |
| | | (1, 0, 1, 0) | | | | | (1, 0, 1, 1) |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| 26/36 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| 27/37 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 1) |
| 28/38 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 1) |
| | (2, 0, 0, 1) | (2, 0, 0, 0) | | (4, 0, 0, 1) | (4, 0, 0, 0) | | (2, 0, 0, 1) |
| 29/39 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| | (2, 0, 1, 1) | (2, 0, 1, 0) | | (5, 0, 0, 1) | (5, 0, 0, 0) | | (2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| 46 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| 47 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| | (1, 0, 1, 0) | | | (3, 0, 0, 0) | | | (3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| 54 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| 55 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| 56 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| 57 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| | (2, 0, 1, *) | (2, 0, 1, *) | (2, 0, 1, *) | (5, 0, 0, *) | (5, 0, 0, *) | (5, 0, 0, *) | (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |

TABLE 5-continued

| PRACH configuration Index | UL/DL configuration (See Table 4.2-2) | | | | | | |
|---|---|---|---|---|---|---|---|
| (see Table 4) | 0 | 1 | 2 | 3 | 4 | 5 | 6 |
| 62 | N/A | N/A | N/A | N/A | N/A | N/A | N/A |
| 63 | N/A | N/A | N/A | N/A | N/A | N/A | N/A |

In [Table 5], four pairs of each format ($f_{RA}$, $t_{RA}^{(0)}$, $t_{RA}^{(1)}$, $t_{RA}^{(2)}$) indicate the positions of specific random access resources. Herein, $f_{RA}$ indicates a frequency resource index in a considered time instance, $t_{RA}^{(0)}=0$, 1, 2 indicates whether corresponding resources are (re)generated in all of even-numbered radio frames or odd-numbered radio frames, $t_{RA}^{(1)}=0$, 1 indicates whether random access resources are located in the first or second half frame, and $t_{RA}^{(2)}$ indicates the number of a UL subframe in which a preamble starts. UL subframe numbers start to be counted, starting from the first UL subframe between two contiguous DL-UL switch points as 0, and is excluded from preamble format 4. Herein, is expressed as (*).

The start of random access preamble formats 0 to 3 is adjusted to the start of a UL subframe for which a UE estimates $N_{TA}=0$, and random access preamble 4 starts $4832 \cdot T_s$ before the end of a UpPTS. Herein, $N_{TA}$ indicates a time offset between a UL radio frame and a DL radio frame.

If time multiplexing is not sufficient to maintain all opportunities of each PRACH configuration needed for a specific density value $D_{RA}$, the opportunities are allocated to time resources in a time resource-first manner and then to frequency resources. For preamble formats 0 to 3, frequency multiplexing is performed according to [Equation 2].

$$n_{PRB}^{RA} = \begin{cases} n_{PRB\ offset}^{RA} + 6\left\lfloor \frac{f_{RA}}{2} \right\rfloor, & \text{if } f_{RA} \bmod 2 = 0 \\ N_{RB}^{UL} - 6 - n_{PRB\ offset}^{RA} - 6\left\lfloor \frac{f_{RA}}{2} \right\rfloor, & \text{otherwise} \end{cases} \quad \text{[Equation 2]}$$

In [Equation 2], $N_{RB}^{UL}$ represents the number of UL RBs, $n_{PRB}^{RA}$ represents the first PRB allocated to a PRACH opportunity, and $n_{PRB\ offset}^{RA}$ represents the first PRB available for a PRACH expressed as the number of PRBs configured by a higher layer, satisfying $0 \leq n_{PRBoffset}^{RA} \leq N_{RB}^{UL} - 6$.

For preamble format 4, frequency multiplexing is performed according to [Equation 3].

$$n_{PRB}^{RA} = \begin{cases} 6 f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases} \quad \text{[Equation 3]}$$

In [Equation 3], $n_f$ indicates a system frame number and $N_{SP}$ indicates the number of DL-UL switch points in a radio frame.

For two frame structure types 1 and 2, each radio access preamble has a bandwidth corresponding to 6 contiguous RBs.

3.4 Method for Generating RACH Preamble

Now, a method for generating an RACH preamble will be described below. A random access preamble (i.e., an RACH preamble) is generated from a Zadoff Chu (ZC) sequence including a Zero Correlation Zone (ZCZ) generated from one or more Root Zadoff Chu (RZC) sequences. A network configures a set of preamble sequences allowed for a UE.

64 preambles are available for each cell. A set of 64 preamble sequences including all possible cyclic shifts of an RZC sequence for a logical index RACH_ROOT_SEQUENCE are searched for in an ascending order of cyclic shifts in the cell. The root index RACH_ROOT_SEQUENCE is broadcast as part of system information. If the 64 preambles are not generated from a single RZC, additional preamble sequences may be acquired from root indexes successive to the corresponding root index until 64 sequences are all detected. The root indexes are cyclically repeated from logical index 0 to logical index 837. For the relationship between logical root sequence indexes and physical root sequence indexes u, refer to [Table 9] and [Table 10] which will be described later.

A $u^{th}$ RZC sequence is defined by [Equation 4].

$$x_u(n) = e^{-j\frac{\pi u n(n+1)}{N_{ZC}}}, 0 \leq n \leq N_{ZC} - 1 \quad \text{[Equation 4]}$$

The length $N_{ZC}$ of a ZC sequence is given in [Table 6]. A random access preamble having a ZCZ of length $N_{CS}-1$, $X_{u,v}(n)$ is defined from the $u^{th}$ RZC sequence using a cyclic shift as expressed in [Equation 5].

$$x_{u,v}(n) = x_u((n + C_v) \bmod N_{ZC}) \quad \text{[Equation 5]}$$

A cyclic shift $C_v$ used in [Equation 5] is given by [Equation 6].

$$C_v = \begin{cases} vN_{CS} & \lfloor N_{ZC}/N_{CS} \rfloor - 1, N_{CS} \neq 0 v = 0, 1, \ldots, & \text{for unrestricted sets} \\ 0 & N_{CS} = 0 & \text{for unrestricted sets} \\ d_{start}\lfloor v/n_{shift}^{RA} \rfloor + & v = 0, 1, \ldots, & \\ (v \bmod n_{shift}^{RA})N_{CS} & n_{shift}^{RA} n_{group}^{RA} + \bar{n}_{shift}^{RA} - 1 & \text{for restricted sets} \end{cases} \quad \text{[Equation 6]}$$

For preamble formats 0 to 4, $N_{CS}$ is given in [Table 7] and [Table 8]. A ZCZ configuration parameter is provided by a higher layer. A high-speed flag parameter provided by the higher layer indicates whether $C_v$ is selected from a restricted set or an unrestricted set. A parameter $d_u$ indicates a cyclic shift corresponding to a Doppler shift size $1/T_{SEQ}$ having a spacing of one subcarrier, given by the following equation.

$$d_u = \begin{cases} p & 0 \leq p < N_{ZC}/2 \\ N_{ZC} - p & \text{otherwise} \end{cases} \quad \text{[Equation 7]}$$

In [Equation 7], the parameter p is a smallest non-negative integer satisfying $(pu) \bmod N_{ZC}=1$. A parameter for a restricted set of cyclic shifts depends on $d_u$. If $N_{CS} \leq d_u < N_{ZC}/3$, parameters for the restricted set are given as [Equation 8].

$n_{shift}^{RA} = \lfloor d_u/N_{CS} \rfloor$ $d_{start} = 2d_u + n_{shift}^{RA} N_{CS}$ $n_{group}^{RA} = \lfloor N_{ZC}/d_{start} \rfloor$ $\bar{n}_{shift}^{RA} = \max(\lfloor N_{ZC} - 2d_u - n_{group}^{RA} d_{start})/N_{CS} \rfloor, 0)$ [Equation 8]

If $N_{ZC}/3 \leq d_u \leq (N_{ZC} - N_{CS})/2$, the parameters for the restricted set are given as [Equation 9].

$n_{shift}^{RA} = \lfloor (N_{ZC} - 2d_u)/N_{CS} \rfloor$ $d_{start} = N_{ZC} - 2d_u + n_{shift}^{RA} N_{CS}$ $n_{group}^{RA} = \lfloor d_u/d_{start} \rfloor$ $\bar{n}_{shift}^{RA} = \min(\max(\lfloor d_u - n_{group}^{RA} d_{start})/N_{CS} \rfloor, 0), n_{shift}^{RA})$ For all other values of $d_u$, no cyclic shift exists in the restricted set.

[Table 6] below lists the lengths of a random access preamble sequence for preamble formats.

TABLE 6

| Preamble format | $N_{ZC}$ |
|---|---|
| 0-3 | 839 |
| 4 | 139 |

[Table 7] below illustrates a mapping relationship between ZCZ configurations and cyclic shift values $N_{CS}$ required for generating a random access preamble used in a restricted set or an unrestricted set, for preamble formats 0 to 3. Herein, $N_{CS}$ is the length of a base ZC sequence.

TABLE 7

| | $N_{CS}$ value | |
|---|---|---|
| zeroCorrelationZoneConfig | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

[Table 8] illustrates a mapping relationship between ZCZ configurations used for preamble format 4 and $N_{CS}$ values used for generation of RACH preambles.

TABLE 8

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

[Table 9] lists the orders of root ZC sequences for preamble formats 0 to 3.

TABLE 9

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |

TABLE 9-continued

| Logical root sequence number | Physical root sequence number u (in increasing order of the corresponding logical sequence number) |
|---|---|
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

[Table 10] lists the order of root ZC sequences for preamble format 4.

TABLE 10

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | | | | | | | | | | N/A | | | | | | | | | | |

3.5 PRACH Parameters

Parameters required to generate a PRACH preamble will be described below.

The PRACH parameters are indicated to a UE by higher-layer signaling (e.g., RRC signaling or MAC signaling). For example, a PRACH-ConfigSIB Information Element (IE) and a PRACH-Config IE are used to explicitly indicate a PRACH configuration (i.e. PRACH parameters) in system information and mobility control information. Particularly, the PRACH-Config IE is transmitted in System Information Block 2 (SIB2). [Table 11] illustrates an example of the PRACH-Config IE.

TABLE 11

```
-- ASN1START
PRACH-ConfigSIB ::=            SEQUENCE {
    rootSequenceIndex              INTEGER (0..837),
    prach-ConfigInfo               PRACH-ConfigInfo
}
PRACH-Config ::=               SEQUENCE {
    rootSequenceIndex              INTEGER (0..837),
    prach-ConfigInfo               PRACH-ConfigInfo
            OPTIONAL               -- Need ON
}
PRACH-ConfigSCell-r10 ::=      SEQUENCE {
    prach-ConfigIndex-r10          INTEGER (0..63)
}
PRACH-ConfigInfo ::=           SEQUENCE {
    prach-ConfigIndex              INTEGER (0..63),
    highSpeedFlag                  BOOLEAN,
    zeroCorrelationZoneConfig      INTEGER (0..15),
    prach-FreqOffset               INTEGER (0..94)
}
-- ASN1STOP
```

In [Table 11], a highSpeedFlag parameter indicates whether cyclic shifts used for generation of RACH preambles are from a restricted set or an unrestricted set. A Prach-ConfiguIndex parameter specifies a PRACH configuration and a preamble format. A prach-FreqOffset parameter indicates a frequency position at which an RACH preamble will be transmitted. A rootSequenceIndex parameter indicates a root ZC sequence. A zeroCorrelationZoneConfig parameter indicates a cyclic shift value $N_{CS}$.

4. Method for Performing RACH Procedure in a D2D Communication Environment

In the embodiments of the present invention, an RACH preamble which is transmitted from the user equipment to obtain uplink synchronization with the base station will be defined as a legacy preamble or a legacy RACH preamble, and an RACH preamble which is transmitted and received between user equipments for D2D communication will be defined as a D2D preamble or a D2D RACH preamble.

Also, it is assumed that the D2D user equipment used in the embodiments of the present invention has a capability capable of identifying the legacy preamble from the D2D preamble and receiving an uplink frequency bandwidth to receive the D2D preamble. That is, the legacy user equipment may only transmit data or signal through the uplink frequency bandwidth, whereas the D2D user equipment may receive data or message to obtain synchronization with another D2D user equipment even through the uplink frequency bandwidth.

Alternatively, the capability of the D2D user equipment may be restricted such that the D2D user equipment may receive an uplink signal from the RACH region only to assure compatibility with the legacy user equipment if possible and fail to receive an uplink signal of another user equipment through the other uplink frequency region.

The legacy preamble and/or D2D preamble used in the embodiments of the present invention may be generated using the method for generating an RACH preamble as described in the section 3. However, if the D2D preamble has a length shorter than that of the legacy preamble, the method for generating an RACH preamble as described in the section 3 may be used by modification suitable for the corresponding length.

In the embodiments of the present invention, subcarriers used for the legacy preamble and the D2D preamble in the RACH region may be allocated by being identified From each other. Supposing that the D2D communication is used in a small cell environment, the D2D preamble needs a sequence length shorter than that of the legacy preamble as a distance between the base station and the user equipment in the small cell environment is shorter (e.g., ⅓ to ⅒, approximately) than that in a normal serving cell environment. Therefore, the number of subcarriers which will be used for D2D preamble transmission on the system may be set to be smaller than the number of subcarriers which will be used for the legacy preamble. That is, the subcarriers which will be used for the D2D preamble may be identified from the subcarriers which will be used for the legacy preamble, whereby orthogonality between the legacy preamble and the D2D preamble may be assured.

Methods for identifying subcarriers which will be used for the legacy preamble from subcarriers which will be used for the D2D preamble are as follows.

4. 1 Method for Allocating Subcarriers—1

The subcarriers which will be used for the legacy preamble may be designated as odd subcarriers of which subcarrier indexes are odd numbers, and the subcarriers which will be used for the D2D preamble may be designated as even subcarriers of which subcarrier indexes are even numbers. Of course, depending on the system environment, the subcarriers which will be used for the legacy preamble may be designated as even subcarriers and the subcarriers which will be used for the D2D preamble may be designated as odd subcarriers.

If the subcarriers are designated as above, each of the preambles is repeated in the time domain, and the user equipment and the base station may transmit and receive a preamble suitable for a purpose of use to and from each other as the subcarriers for the legacy preamble are identified from the subcarriers for the D2D preamble.

4.2 Method for Allocating Subcarriers—2

It is required that the distance between user equipments grouped for D2D user equipments should be more considered in an environment where the D2D preamble will be used than in an environment where the legacy preamble will be used. For example, it is general that the distance between the D2D user equipments is shorter than the distance between the base station and the user equipment. Therefore, a sequence length required for the D2D preamble may be designed to be shorter than a sequence length required for the legacy preamble.

Figure 10:
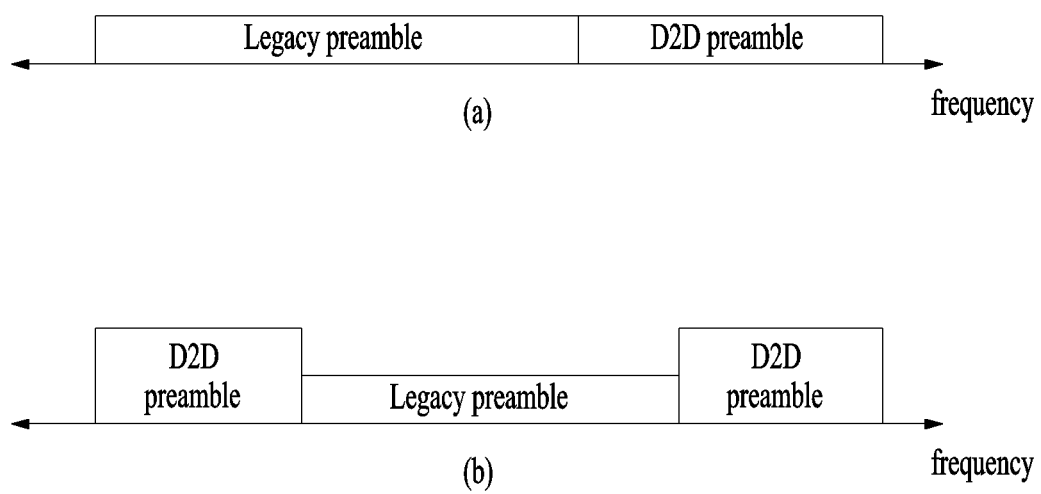
FIG. 10 illustrates a configuration of a legacy preamble and a D2D preamble according to an embodiment of the present invention.

FIG. 10 illustrates a configuration of a legacy preamble and a D2D preamble according to an embodiment of the present invention.

In FIG. 10, a horizontal axis means continuous subcarriers of a frequency unit, which are allocated to a legacy RACH region and a D2D RACH region within a system bandwidth, and a vertical axis means one OFDM symbol. Referring to FIG. 10(a), one or more subcarriers are allocated to the legacy RACH region to which the legacy preamble is transmitted, and the other small area may be allocated as the D2D RACH region to which the D2D preamble is transmitted.

Referring to FIG. 10(b), the D2D RACH region and the legacy RACH region may alternately be allocated within the system bandwidth or the region to which the RACH will be transmitted. For example, the D2D RACH region may first be allocated, the legacy RACH region may be allocated, and then the D2D RACH region may be allocated to the other region. Of course, the RACH region may be allocated in reverse order. Even in this case, it is preferable that the D2D RACH region is smaller than the legacy RACH region.

If the RACH region is divided into the legacy RACH region and the D2D RACH region as illustrated in FIG. 10, the base station may transmit resource allocation information on each RACH region to the D2D user equipment to notify where the D2D RACH region is.

4.3 Method for Transmitting RACH Preamble

Figure 11:
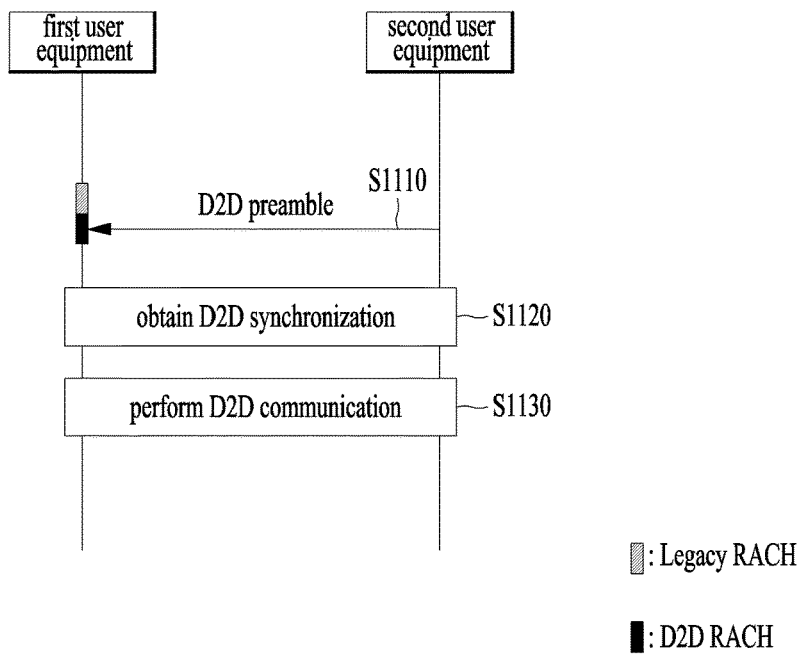
FIG. 11 illustrates one of methods for transmitting and receiving a random access preamble between D2D user equipments according to an embodiment of the present invention.

FIG. 11 illustrates one of methods for transmitting and receiving a random access preamble between D2D user equipments according to an embodiment of the present invention.

In FIG. 11, it is assumed that a first user equipment and a second user equipment are D2D user equipments and D2D communication is performed without control of the base station. Also, it is assumed that the first user equipment and the second user equipment are close to each other to be capable of performing the D2D communication.

The first user equipment, which is the D2D user equipment, may decode the RACH region located in the uplink region to obtain synchronization with another D2D user equipment. Therefore, the first user equipment may receive the D2D preamble from the second user equipment through the D2D RACH region, to which the D2D preamble is transmitted, of the RACH region (S1110).

If the RACH region is divided into the legacy RACH region (that is, first RACH region) and the D2D RACH region (that is, second RACH region) as described in the section 4.1 or 4.2, the first user equipment transmits the legacy preamble at the legacy RACH region only if synchronization with the base station is required, and receives the D2D preamble from the D2D RACH region if synchronization with the D2D user equipment is required.

The first user equipment that has received the D2D preamble performs the RACH procedure with the second user equipment to obtain D2D synchronization, and then may perform D2D communication with the second user equipment (S1120, S1130).

Figure 12:
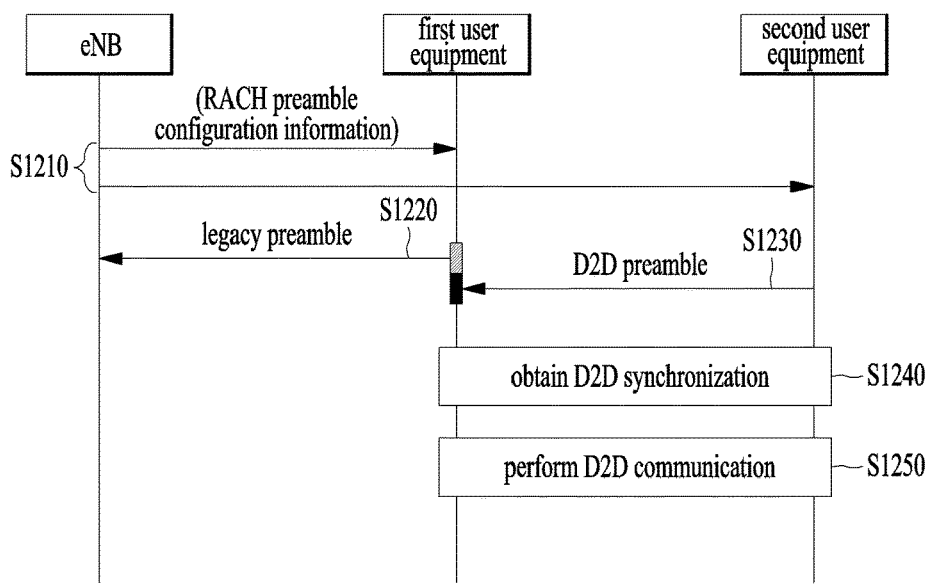
FIG. 12 illustrates another one of methods for transmitting and receiving a random access preamble between D2D user equipments according to an embodiment of the present invention.

FIG. 12 illustrates another one of methods for transmitting and receiving a random access preamble between D2D user equipments according to an embodiment of the present invention.

In FIG. 12, it is assumed that a first user equipment and a second user equipment are D2D user equipments and D2D communication is performed under the control of the base station. Also, it is assumed that the first user equipment and the second user equipment are close to each other to be capable of performing the D2D communication.

If the base station controls D2D connection, the base station may transmit system information block (SIB), which includes RACH preamble configuration information to be used by the D2D user equipments, to the first user equipment and/or the second user equipment (S1210).

At this time, the RACH preamble configuration information may use the RACH preamble configuration information described in the section 3. However, if the RACH region is divided into the legacy RACH region and the D2D RACH region, resource allocation information on each RACH region may further be included in the RACH preamble configuration information or SIB. If the information on the RACH region is not included in the RACH preamble configuration information, the legacy RACH region and the D2D RACH region may be used by being fixed on the system.

Also, the RACH preamble configuration information on the D2D user equipments may include only some of PRACH configuration index, PRACH frequency offset parameter, route sequence index, ZCZ configuration parameter, and quick flag parameter. This is because that the D2D preamble may be designed only if its length is shorter than the length of the legacy preamble or by only using a specific purpose of use (for example, synchronization of the D2D user equipments).

The first user equipment generates the legacy preamble based on the RACH preamble configuration information. Afterwards, the first user equipment transmits the legacy preamble to the base station through the legacy RACH region (S1220).

The second user equipment generates the D2D preamble based on the RACH preamble configuration information. Afterwards, the second user equipment transmits the D2D preamble to the first user equipment through the D2D RACH region. That is, the first user equipment may receive the D2D preamble from the second user equipment through the D2D RACH region (S1230).

After receiving the D2D preamble from the second user equipment, the first user equipment may obtain synchronization by performing the RACH procedure and perform the D2D communication (S1240, S1250).

If a structure of the RACH preamble is made in the form of a Pseudo random Noise sequence (PN) code, the base station may transmit PN code configuration information having different orthogonal features to each D2D user equipment at step S1210, whereby synchronization between the user equipments may be formed.

The legacy RACH region and the D2D RACH region, which are described with reference to FIGS. 11 and 12, may be the RACH regions allocated like the method described in the section 4.1 or 4.2. That is, the RACH region is divided into the legacy RACH region and the D2D RACH region in the frequency domain, and the legacy RACH region and the D2D RACH region may be allocated to the same plane in time.

5. Apparatuses

Figure 13:
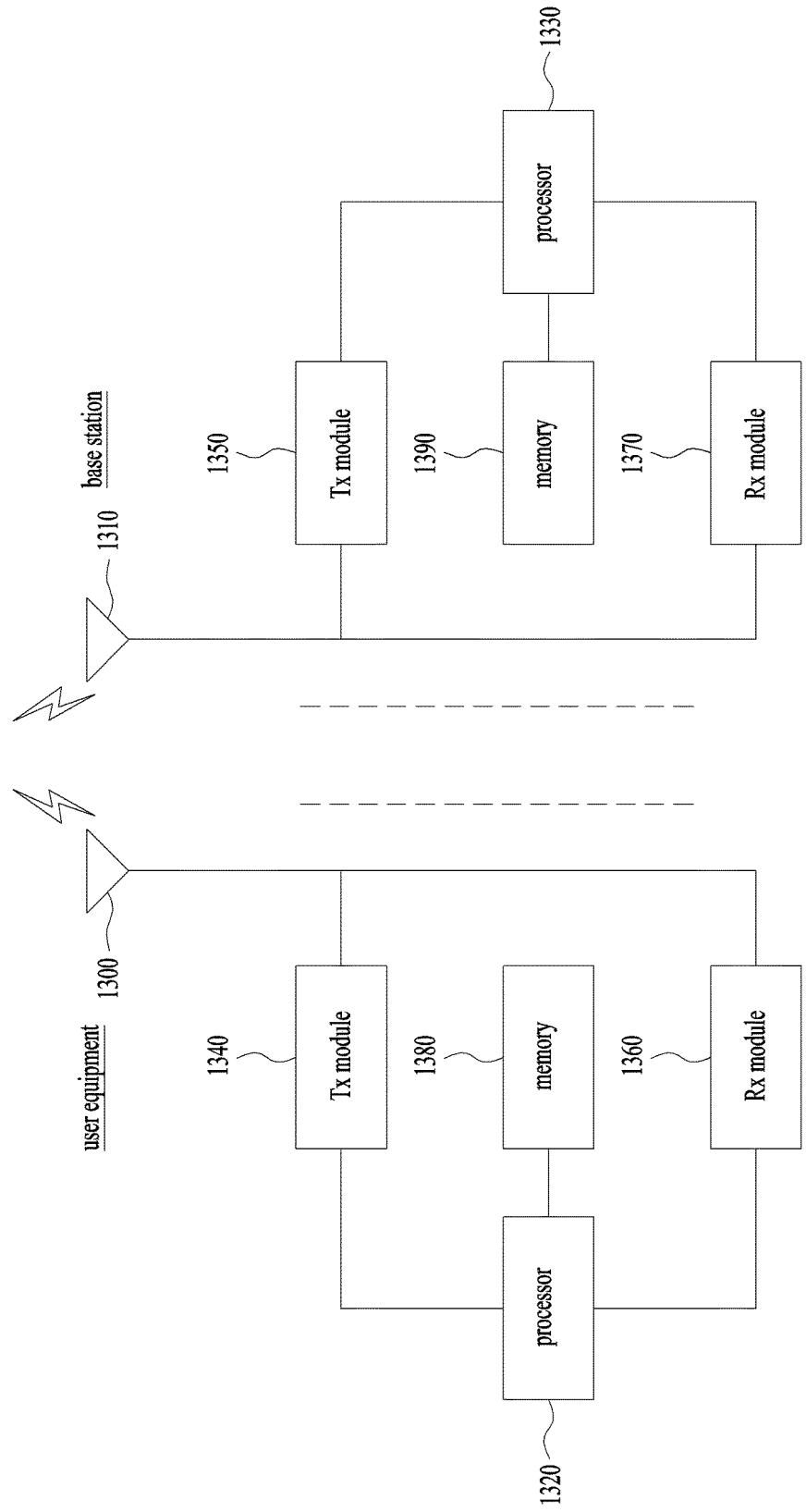
FIG. 13 illustrates an apparatus through which descriptions made in FIGS. 1 to 12 may be implemented.

Apparatuses illustrated in FIG. 13 are means that can implement the methods described before with reference to FIGS. 1 to 12.

A UE may act as a transmitter on a UL and as a receiver on a DL. A BS may act as a receiver on a UL and as a transmitter on a DL.

That is, each of the UE and the BS may include a Transmission (Tx) module 1340 or 1350 and a Reception (Rx) module 1360 or 1370, for controlling transmission and reception of information, data, and/or messages, and an antenna 1300 or 1310 for transmitting and receiving information, data, and/or messages.

Each of the UE and the BS may further include a processor 1320 or 1330 for implementing the afore-described embodiments of the present invention and a memory 1380 or 1390 for temporarily or permanently storing operations of the processor 1320 or 1330.

The embodiments of the present invention may be performed using the aforementioned elements and functions of the user equipment and the base station. For example, the processor of the D2D user equipment may transmit the legacy preamble to the base station at the legacy RACH region of the RACH region to obtain synchronization with the base station and receive the D2D preamble from another D2D user equipment at the D2D RACH region of the RACH region to obtain synchronization with another D2D user equipment in accordance with combination of the methods described in the sections 1 to 4.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 13 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1380 or 1390 and executed by the processor 1320 or 1330. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for obtaining synchronization between devices in a wireless access system, which supports device-to-device (D2D) communication, the method comprising:
receiving, by a first user equipment from a second user equipment, a D2D preamble through a D2D random access channel (RACH) region of a RACH region including a plurality of continuous subcarriers;
obtaining, by the first user equipment, synchronization with the second user equipment by using the D2D preamble; and
performing, by the first user equipment, D2D communication with the second user equipment,
wherein the RACH region includes a legacy RACH region through which a legacy preamble for performing a RACH procedure with a base station is transmitted, and the D2D RACH region,
wherein the RACH region includes the legacy RACH region and the D2D RACH region continuously arranged in a frequency domain,
wherein the legacy RACH region has a size greater than that of the D2D RACH region, and
wherein the legacy RACH region is allocated between at least two D2D RACH regions in the RACH region.

2. The method according to claim 1, wherein the D2D RACH region is configured with one or more continuous subcarriers, and the legacy RACH region is configured with one or more subcarriers which are not overlapped with the D2D RACH region.

3. The method according to claim 1, further comprising:
transmitting, by the first user equipment, a legacy RACH preamble to the base station through the legacy RACH region to obtain synchronization with the base station.

4. The method according to claim 1, further comprising:
receiving, by the first user equipment from the base station, a system information block, which includes RACH configuration information, wherein the RACH configuration information includes resource allocation information on the D2D RACH region.

5. A first user equipment for obtaining synchronization between devices in a wireless access system, which supports device-to-device (D2D) communication, the first user equipment comprising:
a transmitter;
a receiver; and
a processor configured to support acquisition of synchronization between the devices,
wherein the processor is further configured to:
control the receiver to receive a D2D preamble from a second user equipment through a D2D random access channel (RACH) region of a RACH region including a plurality of continuous subcarriers,
obtain synchronization with the second user equipment by using the D2D preamble, and
control the transmitter and the receiver to perform D2D communication with the second user equipment,
wherein the RACH region includes a legacy RACH region through which a legacy preamble for performing a RACH procedure with a base station is transmitted, and the D2D RACH region,
wherein the RACH region includes the legacy RACH region and the D2D RACH region continuously arranged in a frequency domain,
wherein the legacy RACH region has a size greater than that of the D2D RACH region, and
wherein the legacy RACH region is allocated between at least two D2D RACH regions in the RACH region.

6. The first user equipment according to claim 5, wherein the D2D RACH region is configured with one or more continuous subcarriers, and the legacy RACH region is configured with one or more subcarriers which are not overlapped with the D2D RACH region.

7. The first user equipment according to claim 5, wherein the processor is further configured to control the transmitter to transmit a legacy RACH preamble to the base station through the legacy RACH region to obtain synchronization with the base station.

8. The first user equipment according to claim 5, wherein the processor is further configured to control the receiver to receive a system information block, which includes RACH configuration information, from the base station, the RACH configuration information including resource allocation information on the D2D RACH region.

* * * * *